US011878903B2

(12) United States Patent
Koo

(10) Patent No.: US 11,878,903 B2
(45) Date of Patent: Jan. 23, 2024

(54) TAP ASSEMBLY

(71) Applicant: ILLINOIS TOOL WORKS INC., Glenview, IL (US)

(72) Inventor: Yeong-Heng Koo, Auckland (NZ)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/344,554

(22) Filed: Jun. 10, 2021

(65) Prior Publication Data

US 2021/0387847 A1 Dec. 16, 2021

Related U.S. Application Data

(60) Provisional application No. 63/037,947, filed on Jun. 11, 2020.

(51) Int. Cl.
*B67D 3/04* (2006.01)
*B65D 75/58* (2006.01)

(52) U.S. Cl.
CPC ......... *B67D 3/045* (2013.01); *B65D 75/5872* (2013.01)

(58) Field of Classification Search
CPC ............................ B67D 3/045; B67D 75/5827
See application file for complete search history.

(56) References Cited

U.S. PATENT DOCUMENTS 4,440,316 A 4/1984 Christine
6,196,263 B1 3/2001 Woodruff et al.
6,571,994 B1 6/2003 Adams et al.
6,702,161 B2 3/2004 Adams et al.
7,140,520 B1 11/2006 Rutler
7,261,226 B2 8/2007 Adams et al.
7,980,424 B2 7/2011 Johnson
8,075,189 B2 12/2011 Berman
8,276,748 B2 10/2012 Nyambi et al.
8,443,969 B2 5/2013 Nyambi et al.
8,602,387 B2 12/2013 Wrigley et al.
(Continued)

FOREIGN PATENT DOCUMENTS

EP 0 432 070 A1 6/1991
EP 0432070 A1 * 12/1992 ............. F16K 35/10
(Continued)

OTHER PUBLICATIONS

Machine Translation of EP0432070.*
(Continued)

*Primary Examiner* — Jeremy Carroll
(74) *Attorney, Agent, or Firm* — Pauley Erickson & Swanson

(57) ABSTRACT

A tap assembly for dispensing fluid from a flexible container includes a gland for connecting with the container, the gland having an inlet and an outlet. An actuator is in fluid communication with the outlet of the gland, the actuator including a lever, a removable tamper evident tab and a cap, wherein when the tamper evident tab is in position, the actuator is inoperable and the lever and the cap are fixedly joined and wherein, upon removal of the tamper evident tab, the lever is moveable with respect to the cap to dispense fluid from the tap assembly. A connector is latchable with an outlet of the actuator, the connector including an arm to fixedly engage with the lever in a raised position.

18 Claims, 7 Drawing Sheets

(56) References Cited

U.S. PATENT DOCUMENTS

| | | | | |
|---|---|---|---|---|
| 8,695,833 | B2 | 4/2014 | Barron | |
| 8,714,380 | B2 | 5/2014 | Casale et al. | |
| 8,720,744 | B2 | 5/2014 | Barron | |
| 8,967,430 | B2 | 3/2015 | Wrigley | |
| 9,394,088 | B2 | 7/2016 | Bellmore et al. | |
| 9,415,908 | B2 | 8/2016 | Barron | |
| 9,592,940 | B2 | 3/2017 | Nyambi et al. | |
| 9,623,996 | B2 | 4/2017 | Casale et al. | |
| 9,862,531 | B2 | 1/2018 | Johnson | |
| 9,862,533 | B2 | 1/2018 | Stever et al. | |
| 9,862,588 | B2 | 1/2018 | Johnson | |
| 10,179,677 | B2 | 1/2019 | Stever | |
| 10,280,062 | B2 | 5/2019 | Stever et al. | |
| 10,287,081 | B2 | 5/2019 | Stever | |
| 10,301,096 | B2 | 5/2019 | Stever et al. | |
| 10,392,157 | B2 | 8/2019 | Barron | |
| 2013/0285364 | A1* | 10/2013 | Johnson ................ | F16L 41/021 285/8 |
| 2013/0341366 | A1* | 12/2013 | Campbell ............... | F16K 31/52 222/505 |
| 2017/0121168 | A1 | 5/2017 | Johnson | |
| 2018/0029774 | A1 | 2/2018 | Stever | |
| 2019/0256341 | A1 | 8/2019 | Stever et al. | |
| 2019/0337792 | A1* | 11/2019 | Nini ....................... | B67D 3/043 |
| 2021/0347630 | A1 | 11/2021 | Koo | |
| 2022/0041426 | A1* | 2/2022 | Nini ....................... | B65D 47/26 |

FOREIGN PATENT DOCUMENTS

| | | | |
|---|---|---|---|
| EP | 1 322 523 | B1 | 11/2008 |
| EP | 1 465 830 | B1 | 10/2011 |
| EP | 2 038 180 | B1 | 12/2011 |
| EP | 2 325 103 | B1 | 9/2012 |
| EP | 2 125 554 | B1 | 10/2013 |
| EP | 2 616 347 | B1 | 12/2014 |
| EP | 2 874 892 | B1 | 5/2015 |
| EP | 2 616 348 | B1 | 8/2015 |
| EP | 2 701 983 | B1 | 6/2016 |
| EP | 3 048 064 | B1 | 10/2017 |
| EP | 3 529 166 | A1 | 8/2019 |
| EP | 2 424 783 | B1 | 3/2020 |
| WO | WO 2008/014605 | A1 | 2/2008 |
| WO | WO 2016/201226 | A1 | 12/2016 |
| WO | WO 2016/201421 | A1 | 12/2016 |
| WO | WO 2017/007804 | A1 | 1/2017 |
| WO | WO 2018/075184 | A1 | 4/2018 |
| WO | WO 2018/215639 | A1 | 11/2018 |

OTHER PUBLICATIONS

EPO, English language version of the International Search Report, Form PCT/ISA/210 for International Application PCT/US2021/036922, dated Oct. 1, 2021 (4 pages).

EPO, English language version of the Written Opinion of the ISA, Form PCT/ISA/237 for International Application PCT/US2021/036922, dated Oct. 1, 2021 (8 pages).

* cited by examiner

TAP ASSEMBLY

CROSS REFERENCE TO RELATED APPLICATION

This application claims the benefit of U.S. Provisional Application Ser. No. 63/037,947, filed 11 Jun. 2020. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to a tap assembly for dispensing fluids from a container.

Description of Prior Art

Valves and spouts exist for use in connection with liquid containers including pouches, bags, bags in boxes or cartons. Such valves are typically integrated with the container during manufacture of the liquid and/or filling of the container.

A need exists for a self-closing tap that includes a unitary construction and permits adaptation to a continuous supply tap in which the tap remains open for dispensing fluid in an uninterrupted manner.

SUMMARY OF THE INVENTION

The present invention is directed to a tap assembly for dispensing fluid from a container, preferably a flexible pouch or bag, and includes a gland and a cooperative tap assembly. The gland preferably connects with the container and includes an inlet and an outlet. The tap is in fluid communication with the outlet of the gland. The tap preferably includes a unitized cap, a tamper evident tab, and an actuator and permits a user to dispense fluid from a container through the tap by creating a fluid path from the container through the gland and through the tap. An adaptable connector may be fixed to the tap to permit continuous flow through the tap assembly.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
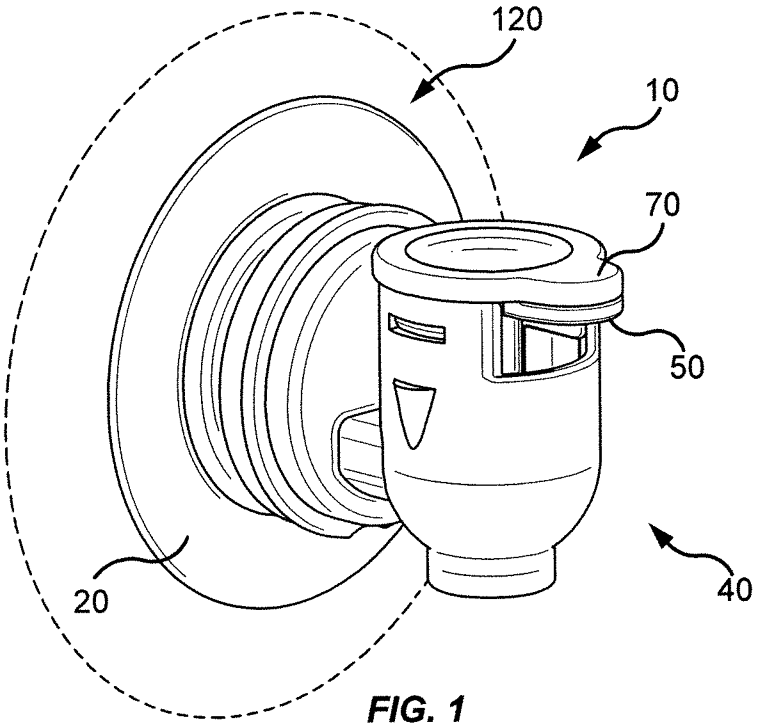
FIG. 1 shows a front perspective view of a tap assembly in an open position according to one embodiment.
Figure 2:
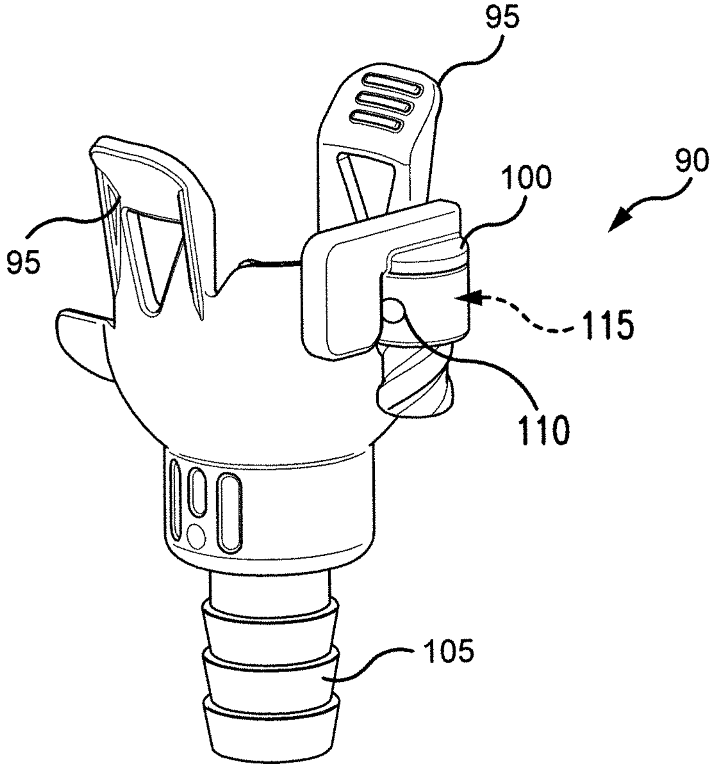
FIG. 2 shows a front perspective view of a connector according to one embodiment.
Figure 3:
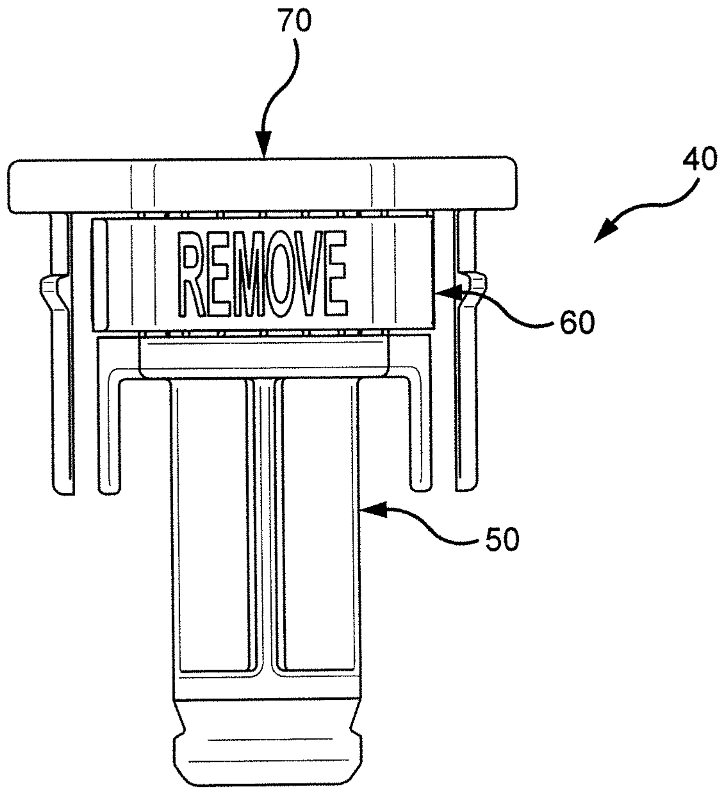
FIG. 3 shows a front view of an actuator of a tap assembly in an unused and closed position according to one embodiment.
Figure 4:
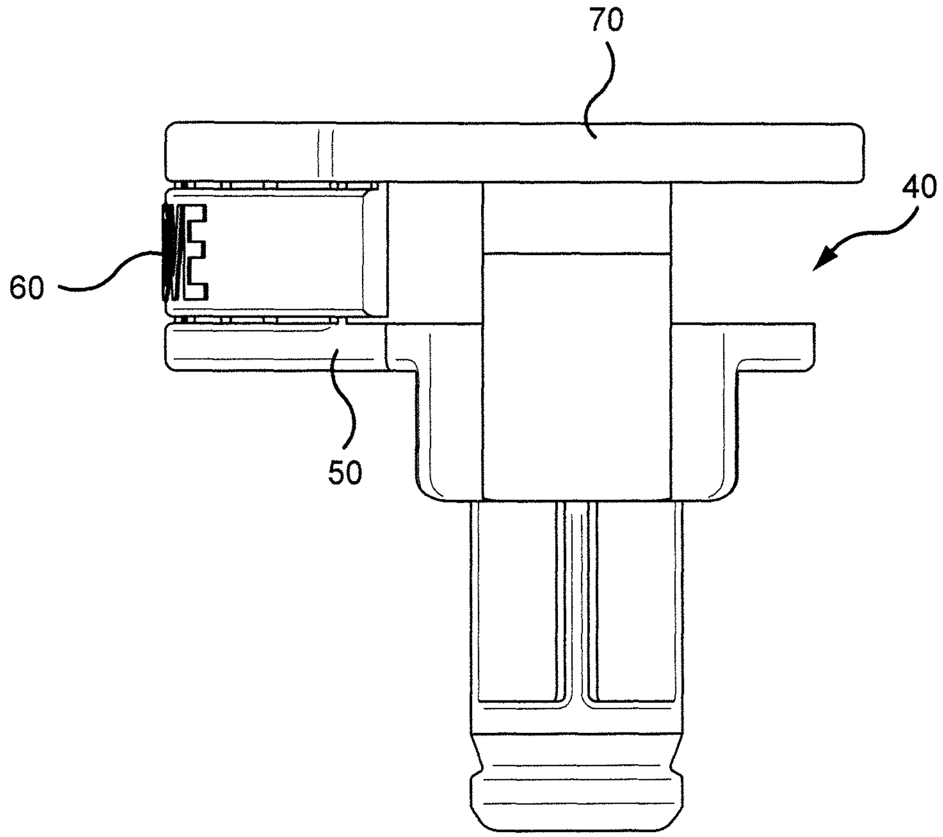
FIG. 4 shows a side view of the actuator shown in FIG. 3.
Figure 5:
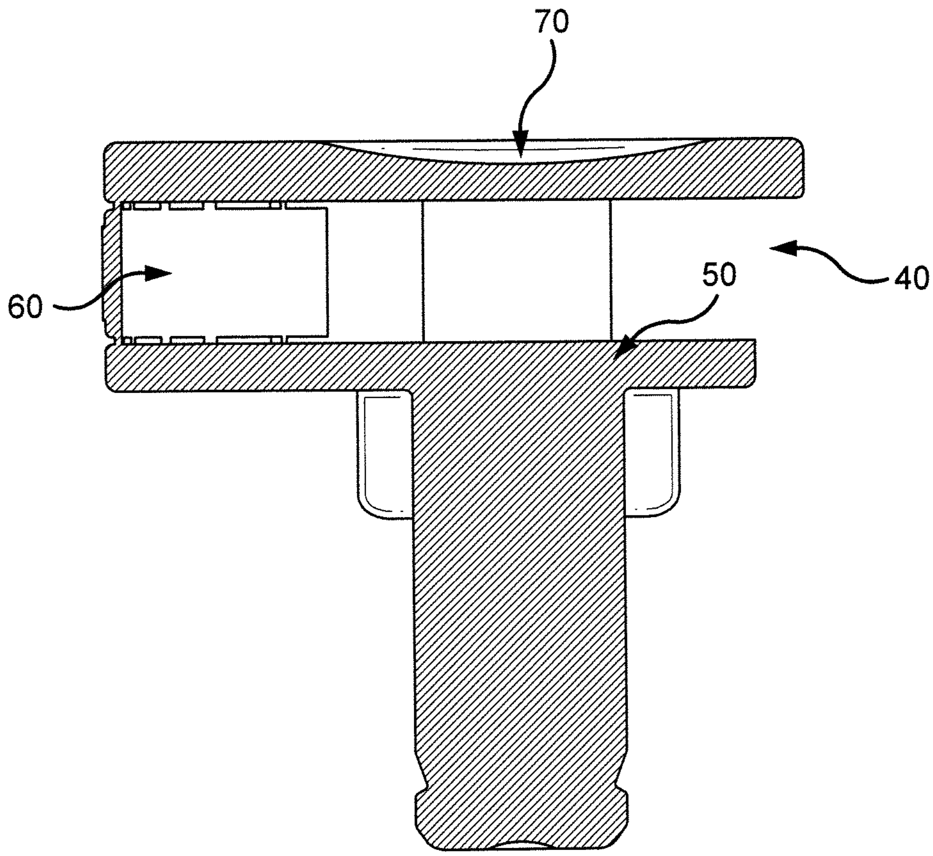
FIG. 5 shows a cross-sectional side view of the actuator shown in FIG. 3.

FIGS. 1-8 show a tap assembly 10 according to preferred embodiments of this invention. FIGS. 1 and 2 show two principal components of the tap assembly 10. FIGS. 3-5 show various views of an actuator 40 according to one embodiment of the invention. FIGS. 6A-6C and 7A-7C show modes of operation of a tap assembly 10. FIGS. 8A and 8B show the internal operation of a tap assembly according to one embodiment of the invention.

As shown in the figures, a tap assembly 10 for dispensing fluid from a container includes a gland 20 for connecting with the container, the gland 20 having an inlet 25 and an outlet 28. The gland 20 may be molded of a food safe plastic and preferably includes a threaded and latched attachment section 35. The gland 20 preferably extends from a container 120 at the inlet 25 to the outlet 28 thereby directing fluid flow away from the container 120.

An actuator 40 is in fluid communication with the outlet 28 of the gland 20. A body 30 may be formed between the actuator 40 and the gland 20 to facilitate attachment and/or manufacturing.

The actuator 40 preferably includes a molded plastic construction that complements the body 30 and/or the gland 20. The body 30 may include a separate or integrated threaded and latched attachment section 45 that engages with and permit rotational engagement with the gland 20. According to an embodiment shown in the drawings, the actuator 40 is configured as a vertical tap thereby drawing fluid out of the container 120 generally perpendicular to an alignment of the gland 20. Such an arrangement is particularly beneficial when applied to a stand-up bag or pouch of fluid.

As best shown in FIGS. 3-5, the actuator 40 preferably includes an lever 50, a removable tamper evident tab 60 and a cap 70. The actuator 40 according to a preferred embodiment of the invention is preferably formed in a unitary molded body with the tamper evident tab 60 formed between the lever 50 and the cap 70.

As such, removal of the tamper evident tab 60 permits the lever 50 to move, with user input, relative to the cap 70. The lever 50 is preferably biased away from the cap 70 when not engaged by a user. The cap 70 and the lever 50 preferably each include a corresponding contour along an outside edge of the actuator 40.

Figure 6C:
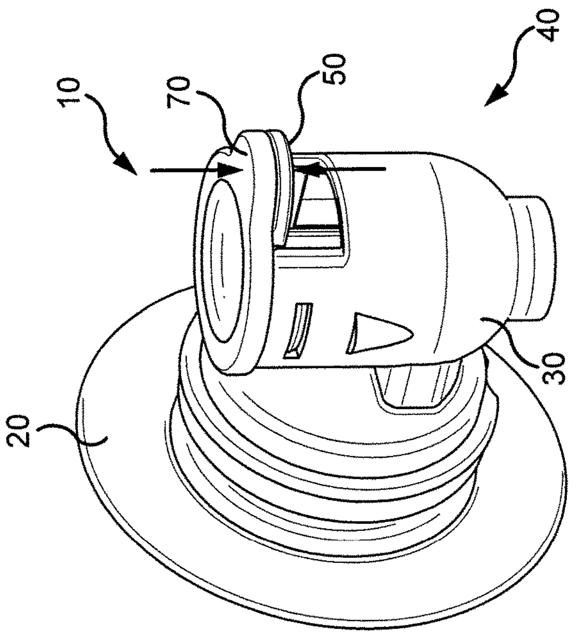
FIG. 6C shows a front perspective view of the tap assembly shown in FIG. 6A in an open position.
Figure 6B:
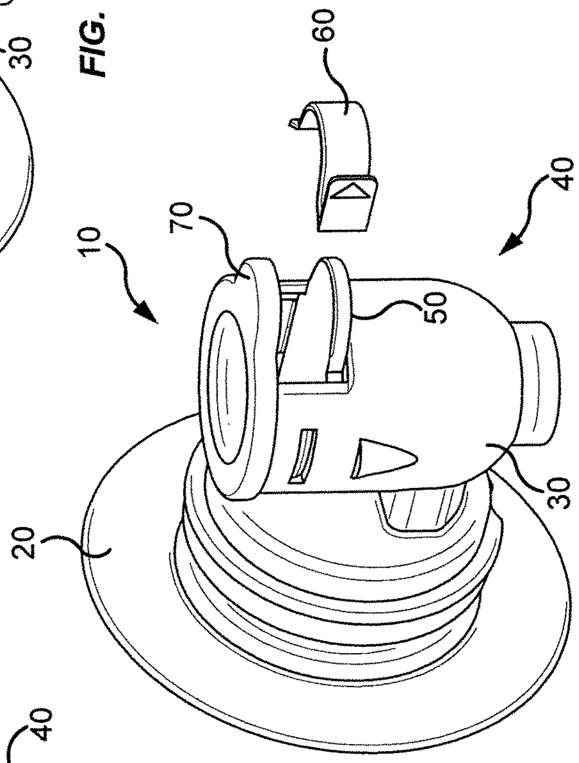
FIG. 6B shows a front perspective view of the tap assembly shown in FIG. 6A with a tamper evident tab removed.
Figure 6A:
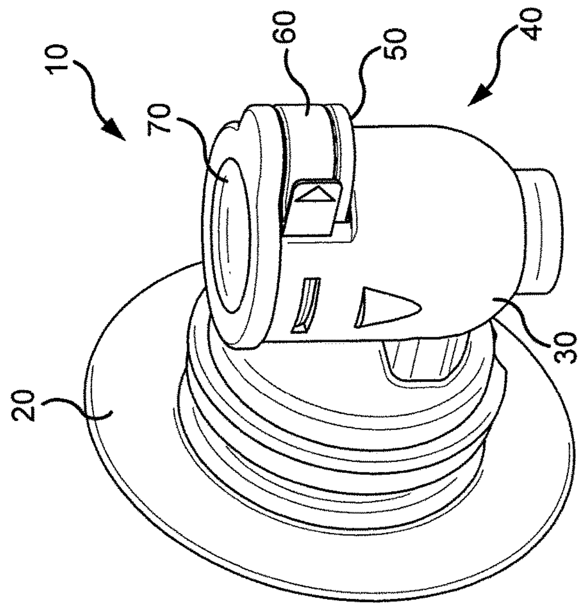
FIG. 6A shows a front perspective view of a tap assembly in an unused and closed position according to one embodiment.
Figure 7C:
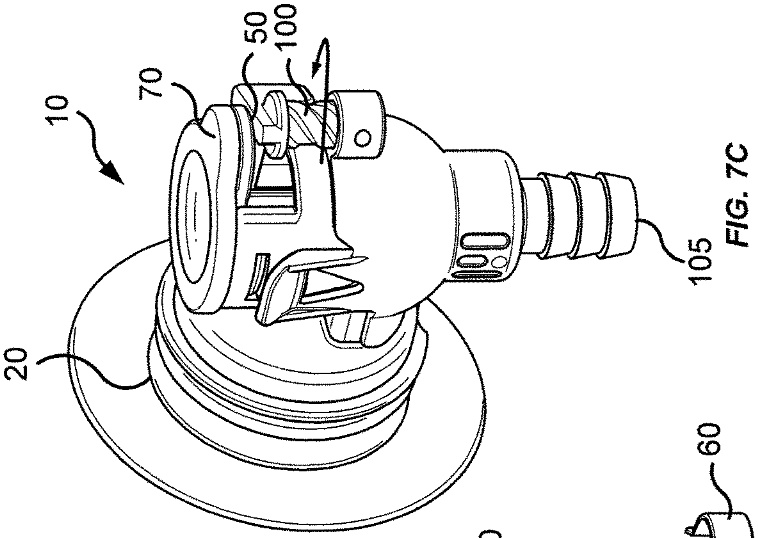
FIG. 7C shows a front perspective view of the tap assembly shown in FIG. 7A in an open position with a lever of the connector engaged.
Figure 7B:
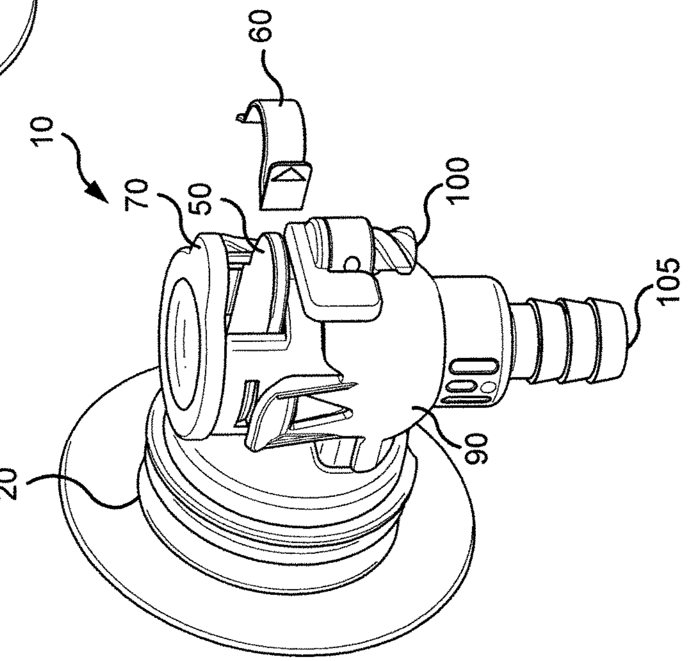
FIG. 7B shows a front perspective view of the tap assembly shown in FIG. 7A with the connector attached and a tamper evident tab removed.
Figure 7A:
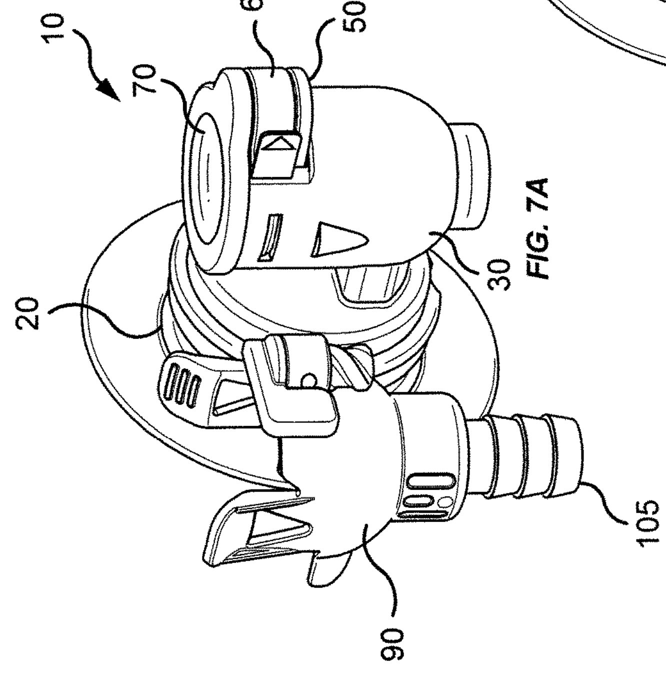
FIG. 7A shows a front perspective view of a tap assembly with a connector in an unused and closed position according to one embodiment.

In operation, as best shown in FIGS. 6A and 7A, when the tamper evident tab 60 is in position, prior to use ("an unused position"), the actuator 40 is inoperable and the lever 50 and the cap 70 are fixedly joined.

As best shown in FIGS. 6B and 7B, the tamper evident tab 60 may be removed to enable operation of the actuator 40. Such removal will simultaneously permit operation and dispensing of fluid and indicate to the user that the container 90 has been opened and possibly breached.

As best shown in FIGS. 6C and 7C, upon removal of the tamper evident tab 60, the lever 50 is moveable with respect to the cap 70 to dispense fluid from the tap. As described, the tamper evident tab 60 is preferably molded into the tap resulting in a unitary structure that is easily removable and visually apparent in both its presence and its absence.

FIGS. 2 and 7A-7C show a tap assembly 10 further comprising a connector 90 engageable with an outlet of the actuator 40. Use of the connector 90 as described transforms the self-closing tap assembly 10 into a continuous supply tap assembly 10. The connector 90 may include an arm 100 to engage the lever 50 toward the cap 70. As shown in FIG. 7, the arm 100 may be threaded relative to the connector 90 to raise the arm 100 into direct contact and interference with the lever 50 thereby effecting a continuous flow. The arm 100 is preferably labeled or molded with "ON" and "OFF" indicators and may be moveable between an indent 110 and a detent 115 to disengage and engage with the lever 50.

The connector 90 may include one or more latches 95 to securely connect the connector 90 to the actuator 40. The latches 95 may be press-fit and flexible to permit attachment and detachment with minimal effort and yet maintain a reliable connection between the connector 90 and the actuator 40. As shown in the figures, the connector 90 may include a hose connector 105 at an outlet to permit attachment of a tube or hose to properly direct fluid flow from the container 90.

Figure 8A:
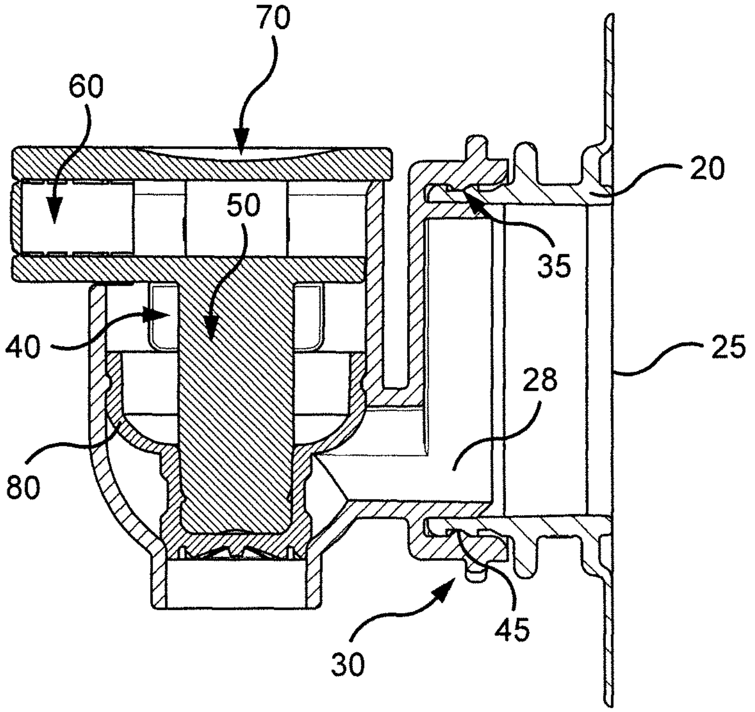
FIG. 8A shows a cross-sectional side view of a tap assembly in a closed and unused position.
Figure 8B:
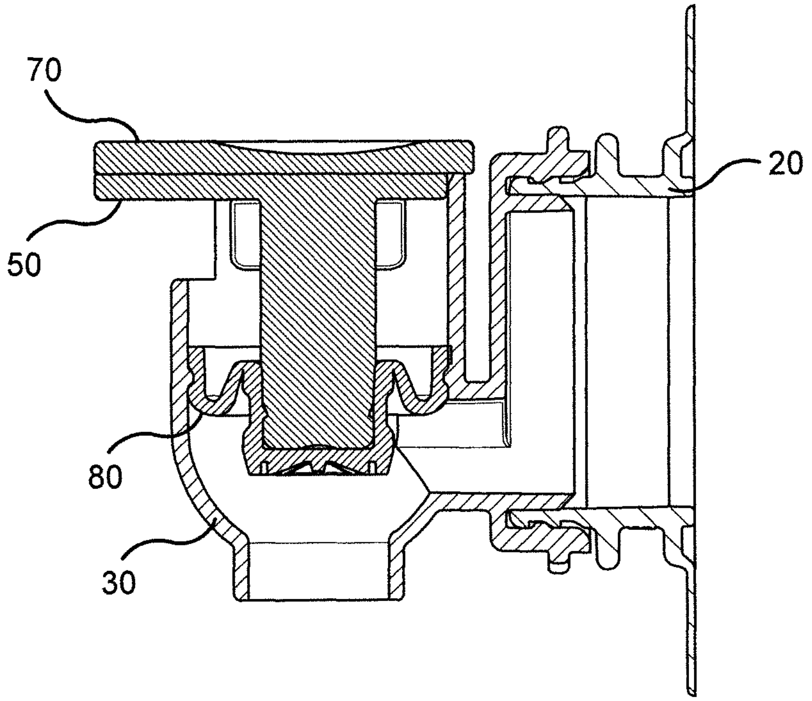
FIG. 8B shows a cross-sectional side view of the tap assembly shown in FIG. 8A in an open position.

FIGS. 8A and 8B show cross-sections of one embodiment of the actuator 40 that demonstrates a closed, unused position and an open position, respectively. As shown in the figures, a flexible button 80 is positioned at or around one end of the lever 50 and biases the lever 50 downward across the fluid path through the actuator 40 thereby preventing flow or leakage when the actuator 40 is not engaged. When the lever 50 is pushed upward toward the cap 70, the button 80 compresses and fluid flow begins. A relative position of the lever 50 and the cap 70 may determine a flow rate of the fluid out of the container 120.

A corresponding method for dispensing fluid from a tap assembly 10 of a flexible container 120 includes connecting the gland 20 with the flexible container 120. A actuator 40 is provided in fluid communication with the outlet 30 of the gland 20. A tamper evident tab 60 is removed by a user from between an lever 50 and a cap 70 of the actuator 40. The lever 50 is thereby moveable toward the cap 70 to permit flow of the fluid from the container 120. When the desired amount of fluid is dispensed, the lever 50 is released thereby closing the tap assembly 10. A user may further latch the connector 90 to an outlet of the actuator 40 and turn the arm 100 into interference with the downward bias of the lever 50 thereby continuously dispensing fluid in a desired manner.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A tap assembly for dispensing fluid from a container comprising:
- a gland for connecting with the container, the gland having an inlet and an outlet;
- an actuator in fluid communication with the outlet of the gland, the actuator including a lever, a removable tamper evident tab and a cap, wherein when the tamper evident tab is in position, the actuator is inoperable and the lever and the cap are fixedly joined and wherein, upon removal of the tamper evident tab, the lever is moveable with respect to the cap to dispense fluid from the tap; and
- a connector engageable with an outlet of the actuator, the connector including an arm to engage the lever toward the cap, wherein the arm moves between an indent and a detent to disengage and engage with the lever.

2. The tap assembly of claim 1 further comprising a connector engageable with an outlet of the actuator, the connector including an arm to engage the lever toward the cap.

3. The tap assembly of claim 2 wherein the connector includes a latch to connect with respect to the actuator.

4. The tap assembly of claim 2 wherein the connector includes a hose connector at an outlet.

5. The tap assembly of claim 1 wherein the container is one of a pouch and a flexible bag.

6. The tap assembly of claim 1 further comprising a hose connector that is engageable with an outlet of the connector.

7. The tap assembly of claim 1 wherein an outlet of the tap is perpendicular with an outlet of the gland.

8. The tap assembly of claim 1 wherein the cap and the lever each include a corresponding contour along an outside edge of the tap.

9. The tap assembly of claim 1 wherein the cap, the lever and the tamper evident tab are formed in a unitary body.

10. The tap assembly of claim 9 wherein removal of the tamper evident tab permits the lever to move relative to the cap.

11. The tap assembly of claim 1 wherein the tamper evident tab is positioned directly between the lever and the cap.

12. The tap assembly of claim 1 further comprising a body connected between the gland and the actuator.

13. A tap assembly for dispensing fluid from a container comprising:
- a gland for connecting with the container, the gland having an inlet and an outlet;
- an actuator in fluid communication with the outlet of the gland, the actuator including a lever, a removable tamper evident tab and a cap, wherein when the tamper evident tab is in position, the actuator is inoperable and the lever and the cap are fixedly joined and wherein, upon removal of the tamper evident tab, the lever is moveable with respect to the cap to dispense fluid from the tap; and
- a connector engageable with an outlet of the actuator, the connector including an arm to engage the lever toward the cap, wherein the arm is threaded relative to the connector to raise the arm into direct contact and interference with the lever.

14. The tap assembly of claim 13 wherein the arm moves between an indent and a detent to disengage and engage with the lever.

15. A tap assembly for dispensing fluid from a container comprising:

a gland for connecting with the container, the gland having an inlet and an outlet;

an actuator in fluid communication with the outlet of the gland, the actuator including a lever, a removable tamper evident tab and a cap, wherein when the tamper evident tab is in position, the actuator is inoperable and the lever and the cap are fixedly joined and wherein, upon removal of the tamper evident tab, the lever is moveable with respect to the cap to dispense fluid from the actuator; and a connector latchable with an outlet of the actuator, the connector including an arm to fixedly engage with the lever in a raised position, wherein the arm is threaded relative to the connector to raise the arm into direct contact and interference with the lever.

16. A tap assembly for dispensing fluid from a container comprising:

a gland for connecting with the container, the gland having an inlet and an outlet;

an actuator in fluid communication with the outlet of the gland, the actuator including a lever, a removable tamper evident tab and a cap, wherein when the tamper evident tab is in position, the actuator is inoperable and the lever and the cap are fixedly joined and wherein, upon removal of the tamper evident tab, the lever is moveable with respect to the cap to dispense fluid from the actuator; and a connector latchable with an outlet of the actuator, the connector including an arm to fixedly engage with the lever in a raised position, wherein the arm moves between an indent and a detent to disengage and engage with the lever.

17. The tap assembly of claim 13 wherein the arm is threaded relative to the connector to raise the arm into direct contact and interference with the lever.

18. The tap assembly of claim 15 wherein the lever is biased away from the cap.

* * * * *